United States Patent [19]

Takatori

[11] Patent Number: 5,625,855
[45] Date of Patent: Apr. 29, 1997

[54] PHOTOGRAPHIC FILM CASSETTE WITH LOCK BIASING LIGHT SHIELD CLOSED

[75] Inventor: Tetsuya Takatori, Kanagawa, Japan

[73] Assignee: Fuji Photo Film Co., Ltd., Kanagawa, Japan

[21] Appl. No.: 575,031

[22] Filed: Dec. 19, 1995

[30] Foreign Application Priority Data

Dec. 26, 1994 [JP] Japan ................................. 6-323169

[51] Int. Cl.$^6$ .................................................. G03B 17/26
[52] U.S. Cl. ............................................ 396/513; 396/514
[58] Field of Search ................................. 396/512, 513, 396/514, 516

[56] References Cited

U.S. PATENT DOCUMENTS

| | | | |
|---|---|---|---|
| 5,296,886 | 3/1994 | Zander et al. | 396/514 |
| 5,296,887 | 3/1994 | Zander | 396/512 X |
| 5,317,355 | 5/1994 | Zander et al. | 396/513 |
| 5,319,407 | 6/1994 | DiRisio | 396/513 |
| 5,572,272 | 11/1996 | Zander et al. | 396/513 |

*Primary Examiner*—Howard B. Blankenship
*Attorney, Agent, or Firm*—Sughrue, Mion, Zinn, Macpeak & Seas

[57] ABSTRACT

A photographic film cassette comprises a locking member pivotally movable into engagement with a spool to inhibit rotation of the spool. The locking member is moved by a light-shielding door member through a cam. A cam follower surface of the locking member is brought into contact with the cam in the closed position of the light-shielding door member, such that force biasing the light-shielding door member toward the closed position is applied from the locking member to the light-shielding door member in the closed position. The locking member is provided with a hook for engagement with a recessed portion formed in an inner wall of a cassette shell. The hook is engaged with the recessed portion when the locking member is placed in an initial assembled position. Thereafter, the locking member is rotated about the hook from the initial assembled position into a final assembled position where a smaller clearance is provided between the hook and the recessed portion compared with the initial assemble position.

14 Claims, 10 Drawing Sheets

PHOTOGRAPHIC FILM CASSETTE WITH LOCK BIASING LIGHT SHIELD CLOSED

BACKGROUND OF THE INVENTION

1. Field of the Invention

The present invention relates to a photographic film cassette. More particularly, the present invention relates to a photographic film cassette containing an entire length of a photographic filmstrip therein so as to be capable of advancing out of the cassette shell in response to an unwinding rotation of a spool about which the photographic filmstrip is coiled. More specifically, the present invention relates to a photographic film cassette having a spool lock mechanism for preventing rotation of the spool and a light-shielding door for closing a film passage mouth to shield ambient light from entering the cassette interior.

2. Background Art

For example, U.S. Pat. Nos. 5,296,887, 5,317,355 and 5,319,407 disclose photographic film cassettes, in each of which a photographic filmstrip is entirely contained in a cassette shell, and when a spool is rotated, the leader is responsively advanced to the outside of the cassette shell. These patents also disclose a light-shielding door that is adapted to be rotated by a specific drive shaft of a camera so as to open the film passage mouth, and a spool lock mechanism interconnecting between the spool and the light-shielding door so as to prevent rotation of the spool when the light-shielding door is closed.

The spool lock mechanism as disclosed in U.S. Pat. No. 5,317,355 is shown in FIGS. 10A, 10B and 10C. A locking member 200 is a single-piece device comprising first and second resilient arms 201 and 202 and a support extension 200a supporting the second arm 201. The support extension 200a and the first arm 201 converge to a common base 203. The locking member 200 is supported for pivotal movement at the base 203 about an axis pin 204. The axis pin 204 is formed on an inner surface of a cassette shell 205 of a photographic film cassette 206. A film passage mouth 209 of the cassette shell 205 is provided with a light-shielding door 210.

FIG. 10A shows a closed position of the light-shielding door 210, wherein a free end 201a of the first arm 201 is in contact with a cam 211 of the light-shielding door 210 and a protuberance 212 on the support extension 200a is in engagement with a gear portion 216 of a spool core 215, such that the locking member 200 is deformed under a compressive force. Due to the resiliency of the first arm 201, the light-shielding door 210 is secured closed. Also the protuberance 212 is pressed against the gear portion 216, so the spool 215 is secured to be not-rotatable. The secure arm 202 has a click 202a at its free end. The click 202a interlocks with a protrusion 219 formed on the inner surface of the cassette shell 205.

After the photographic film cassette 206 is loaded in a camera, the light-shielding door 210 is rotated by a drive shaft of the camera into an open position as shown in FIG. 10B, wherein the free end 201a of the first arm 201 is disengaged from the cam 211, so the locking member 200 recovers its original shape. As a result, the urging force of the locking member 200 toward the spool core 215 is so diminished that the spool core 215 is made rotatable. Thereafter when the spool core 215 is rotated in an unwinding direction as shown by an arrow in FIG. 10C, a tooth of the gear 216 pushes the protuberance 212 on the support extension 200a, thereby bending the support extension 200a toward the light-shielding door 210. As a result, the click 202a passes over the protrusion 219 to fix the locking member 200 in its unlock position shown in FIG. 10C, wherein the protuberance 212 is disengaged from the gear 216, so the spool core 215 is kept rotatable. Further rotation of the spool core 215 in the unwinding direction causes a not-shown photographic filmstrip to advance out of the cassette shell 205 through the film passage mouth 209.

FIGS. 11A, 11B and 11C show the spool lock mechanism as disclosed in U.S. Pat. No. 5,319,407, wherein a locking member 250 is a single-piece yoke-shaped device. The locking member 250 is pivotal about a pivot protuberance 251 which protrudes outwards to be supported in a socket 253 formed on an inner surface of a cassette shell 252. A free end 256 of the locking member 250 is engaged in a recessed surface 259a of a cam 259 formed with a light-shielding door 255. A locking tooth 261 is formed in a middle portion of the locking member 250 to protrude inwards therefrom.

When the light-shielding door 255 is closed as shown in FIG. 11A, the locking tooth 261 is engaged with a gear 263 of a spool core 262 to prevent rotation of the spool core 262. The spool core 262 can be forcibly rotated in the unwinding direction as shown by an arrow in FIG. 11B. When the spool core 262 rotates, a tooth of the gear 263 pushes the locking tooth 261 outwards, so that the locking member 250 is forced to rotate about the pivot protuberance 251 in a direction to remove from the gear 263. As a result, the free end 256 pushes a protrusion 259b of the cam 259 to rotate the cam 259 in a direction to open the light-shielding door 255. When the light-shielding door 255 is set in the open position as shown in FIG. 11C, the free end 256 of the locking member 250 is supported by another protrusion 259c of the cam 259 so as to keep the locking tooth 261 away from the gear 263.

PROBLEMS TO BE SOLVED BY THE INVENTION

In the configuration of U.S. Pat. No. 5,317,355, the locking member 200 is compressed to apply a force to the light-shielding door 210 in the opening direction while the light-shielding door 210 is closed. Accordingly, even a small force in the opening direction can accidentally open the light-shielding door 210.

In U.S. Pat. No. 5,319,407, the locking member 250 is supported in the cassette shell 252 by merely fitting the pivot protuberance 251 in the socket 253. Although such a configuration is easy to assemble, the position and thus the operation of the locking member 250 tend to be unstable and inaccurate. Moreover, as the spool core 262 can be forcibly rotated to open the light-shielding door 255, the light-shielding door 255 is apt to open by accident.

OBJECT OF THE INVENTION

In view of the foregoing, an object of the present invention is to provide a photographic film cassette having a light-shielding door which will not accidentally open.

Another object of the present invention is to provide a photographic film cassette having a spool lock mechanism which is easy to assemble in a cassette shell, but is precisely positioned in the cassette shell.

SUMMARY OF THE INVENTION

. To achieve the first object, the present invention shapes a cam surface of a light-shielding door member and a cam follower surface of a locking member such that the cam surface and the cam follower surface are in contact with each other in the closed position of the light-shielding door member, and that force biasing the light-shielding door member toward the closed position is applied from the locking member to the light-shielding door member in its closed position.

According to the present invention, in the closed position of the light-shielding door member, a normal line to the cam follower surface at the contact point with the cam surface is shifted from a rotary axis of the light-shielding door member such that the normal force from the locking member turns into a torque to rotate the light-shielding door member toward the closed direction.

To achieve the second object, the present invention provides a locking member with an engaging member for engagement with an engaging portion formed in an inner wall portion of a cassette shell. The engaging member is engaged with the engaging portion when the locking member is placed in an initial assembled position. Thereafter, the locking member is rotated about the engaging member from the initial assembled position to a final assembled position where a smaller clearance is provided between the engaging portion and the engaging member compared with the initial assemble position.

BRIEF DESCRIPTION OF THE DRAWINGS

The present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
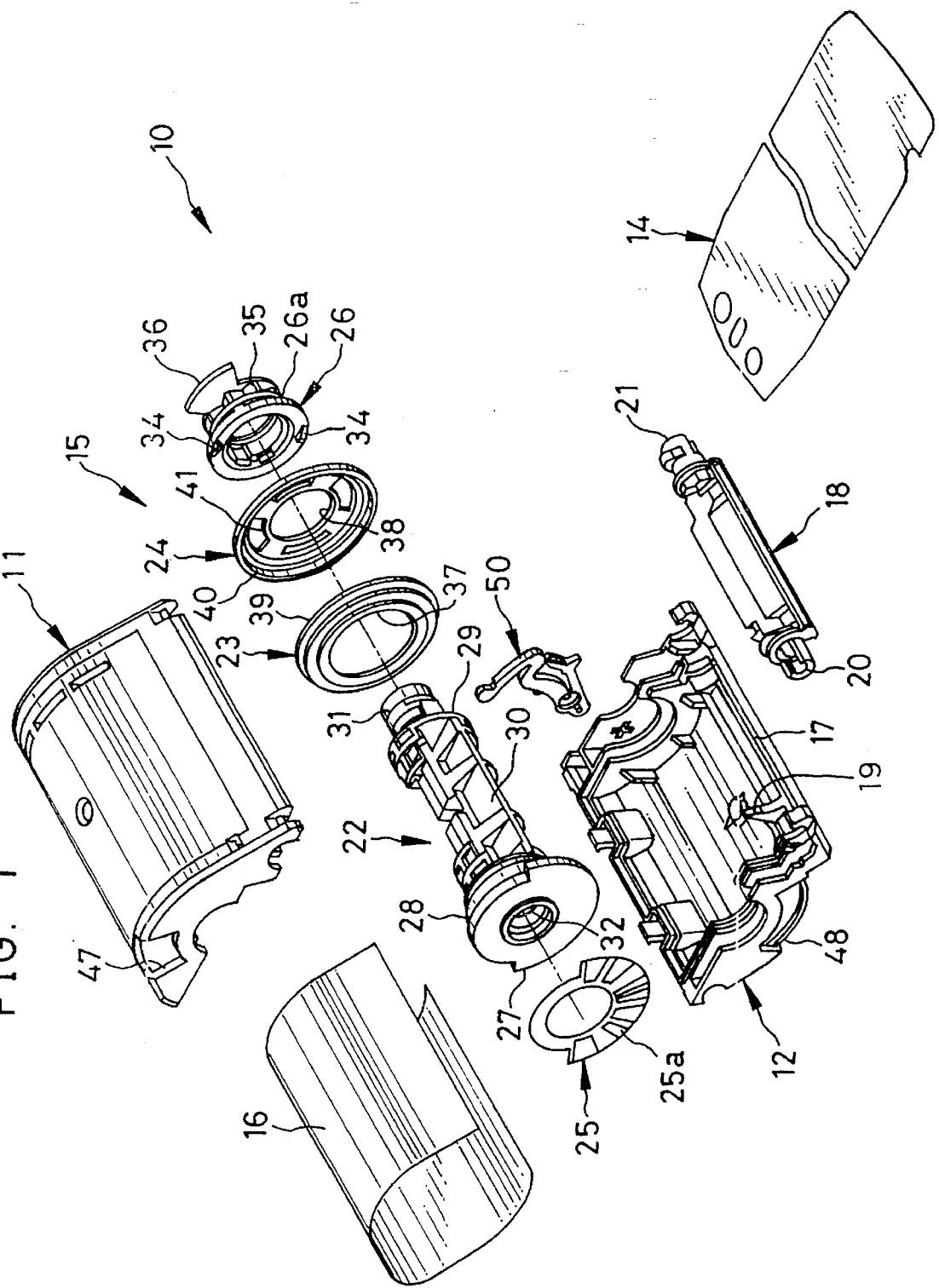
FIG. 1 is an exploded perspective view of a photographic film cassette according to a preferred embodiment of the invention.

FIG. 1 illustrates a photographic film cassette 10, which is constituted of a cassette shell 13, a spool 15 rotatably contained in the cassette shell 13, a photographic filmstrip 14 wound on the spool 15 into a roll, and a shell label 16 adhered to a peripheral surface of the cassette shell 13. The cassette shell 13 is constituted of a pair of shell halves 11 and 12, each being a molded part formed from resin.

A passage slot 17 for the photographic filmstrip 14 is formed along a juncture between the shell halves 11 and 12. Behind the passage slot 17 is disposed a light-shielding door 18 which is closed to prevent ambient light from entering the cassette interior through the passage slot 17. A separation claw 19 is disposed behind the light-shielding door 18 to separate a leader of the photographic filmstrip 14 from the roll and guide it toward the passage slot 17. The light-shielding door 18 has key holes 20 and 21 on both ends thereof for allowing the light-shielding door 18 to be rotated by corresponding drive shafts of a camera between the closed position and an open position for enabling the filmstrip 14 to pass through the passage slot 17.

The spool 15 is constituted of a spool core 22, a pair of flanges 23 and 24 mounted on opposite ends of the spool core 22. A relatively large data disc 27 is formed integrally with the spool core 22 at one end thereof. Therefore, the flanges 23 and 24 are fitted from the opposite end of the spool core 22, and a ring unit 26 is mounted on the opposite end outside the flange 24. A bar code label 25 is adhered to the data disc 27. Engaging portions 28 and 29 are integrally formed with the spool core 22, for positioning the flanges 23 and 24 in the axial direction on the spool core 22. A slit 30 for securing a film trailer is also formed through the spool core 22. A supporting portion 31 for the ring unit 26 is formed outside the engaging portion 29. Key holes 32 and 33 are formed in end faces of the spool core 22 for engagement with drive shafts of the camera.

The ring unit 26 has a base ring portion 26a with two ratchet claws 34, a gear 35 and an indication flag 36, which are formed integrally into a part. The ring unit 26 rotates together with the spool core 22.

A locking member 50 is mounted inside the cassette shell 13. The locking member 50 is adapted to interlock with the gear 35 when the light-shielding door 18 is in the closed position, to lock the spool core 22 in a stationary state to prevent the filmstrip 14 from advancing. When the light-shielding door 18 is opened, the locking member 50 is disengaged from the gear 35.

The flanges 23 and 24 are formed from a plastic material to be thin and elastic discs. Round holes 37 and 38 are formed around the rotational centers of the flanges 23 and 24. The flanges 23 and 24 have circumferential lips 39 and 40, which protrude toward each other to cover the outermost convolution of the roll of the filmstrip 14 when the flanges 23 and 24 are mounted on the spool core 22. This construction prevents the film roll from loosening, and permits transmitting rotational movement of the spool core 22 to the outermost convolution of the film roll.

The flange 24 has four semi-circular slots 41 formed at equal intervals around the round hole 38. The ratchet claws 34 of the ring unit 26 are inserted in the slots 41 such that, while the spool core 22 rotates in a winding direction, the ratchet claws 34 slide over one ends of the slots 41 to let the spool core 22 rotate separately from the flanges 23 and 24. Accordingly, the filmstrip 14 being wound is slid along the lips 39 and 40 of the flanges 23 and 24 while being confined in its lateral direction by the flanges 23 and 24.

When the spool core 22 rotates in a film advancing direction reverse to the winding direction, the ratchet claws 34 engage with the other ends of the slots 41 to rotate the flange 24 with the spool core 22. Then the roll of filmstrip 14 is rotated together with the spool core 22. As a result, a film leader is separated by the separation claw 19 from the roll. Further rotation of the spool 15 in the film advancing direction makes the film leader push aside the elastic flanges 23 and 24 to release the filmstrip 14 from confinement of the lips 39 and 40. Thus, the filmstrip 14 is allowed to be advanced through the passage slot 17 to the outside of the cassette shell 13.

Since the flanges 23 and 24 operate differently from each other, the flanges 23 and 24 must be properly positioned. To prevent misplacing, the center holes 37 and 38 of the flanges 23 and 24 are formed to have different diameters. Correspondingly, the engaging portions 28 and 29 for the flanges 23 and 24 have different diameters from each other.

The bar code label 25 has bar codes 25a printed thereon to represent various data such as the type of the photographic filmstrip 14. While the spool 15 is rotated in the film advancing direction, the bar codes 25a are read by a sensor of the camera through an opening 47 formed through an end face portion of the one shell half 11, hereinafter called the upper shell half. The bar code data is used for calculating an exposure value, for setting the number of available exposure frames in a frame number counter of the camera, and so forth. It is possible to eliminate the bar code label 25 and form the bar codes directly on the data disc 27.

Since the filmstrip 14 is entirely contained in the cassette shell 13 before as well as after the exposure, it is hard to discriminate from appearance between unused and used ones. To prevent a used photographic film cassette 10 from being loaded again in the camera, an anti-reuse opening 48 is formed through the other, i.e. lower shell half 12 in the same side as the opening 47. When the photographic film cassette 10 is loaded in a cassette chamber of the camera, the anti-reuse opening 48 is disposed in opposition to a camera lever (not-shown) mounted inside the cassette chamber.

Before the photographic film cassette 10 is used, a larger diameter sector portion of the data disc 27 is set in the anti-reuse opening 48. After the photographic film cassette 10 is loaded and exposed in the camera, the drive shafts of the camera rotates the spool 15 to retract the larger diameter sector portion of the data disc 27 from the opening 48. Therefore, the camera can distinguish used photographic film cassettes 10 from unused ones with reference to the rotational position of the lever mounted in the cassette chamber.

Figure 2A:
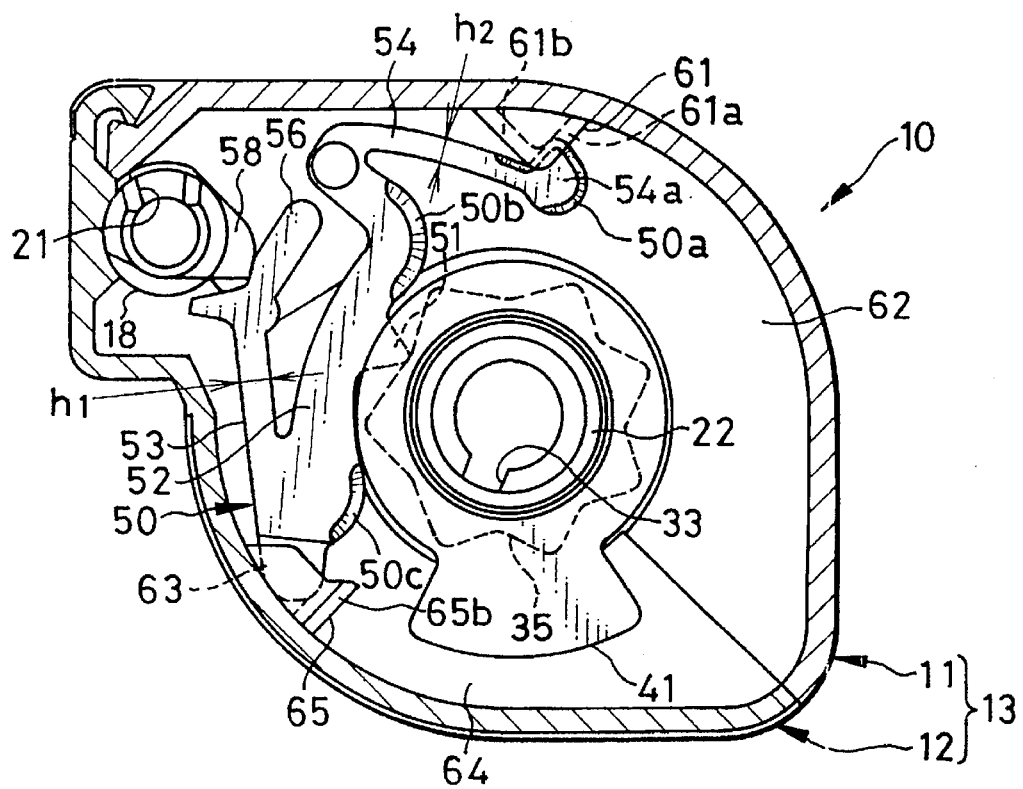
FIG. 2A is a sectional view of the photographic film cassette shown in FIG. 1, illustrating a locking member in a locking position and a light-shielding door in a closed position.
Figure 2B:
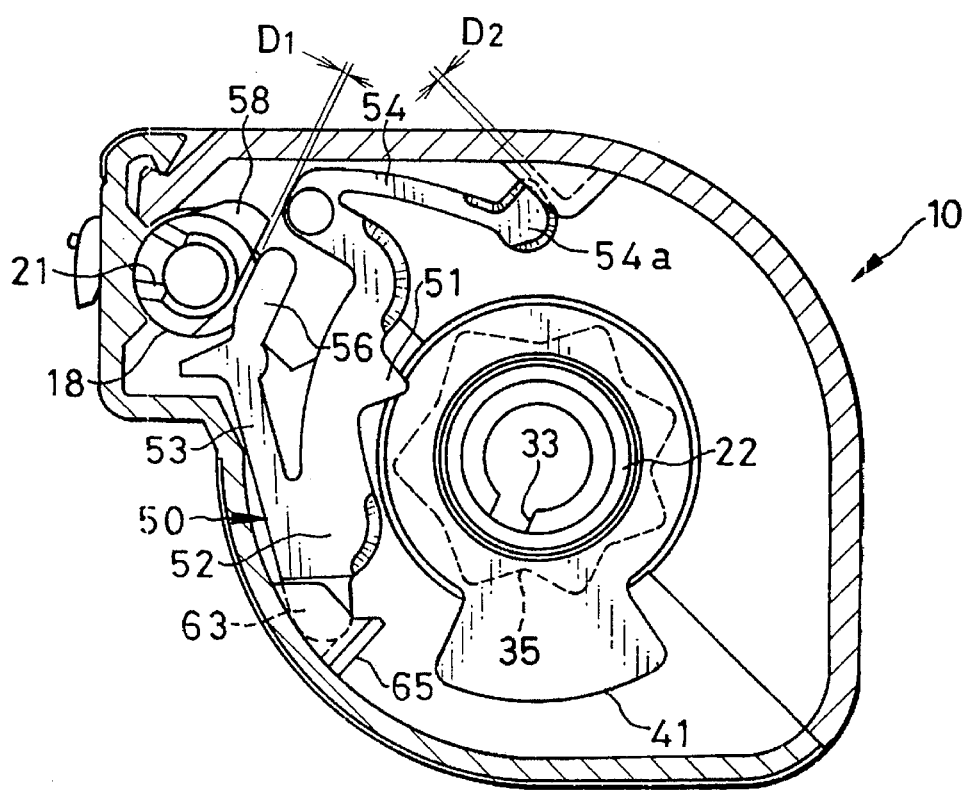
FIG. 2B is a view similar to FIG. 2A, but illustrating the locking member in an unlocked position and the light-shielding door in an open position.
Figure 3:
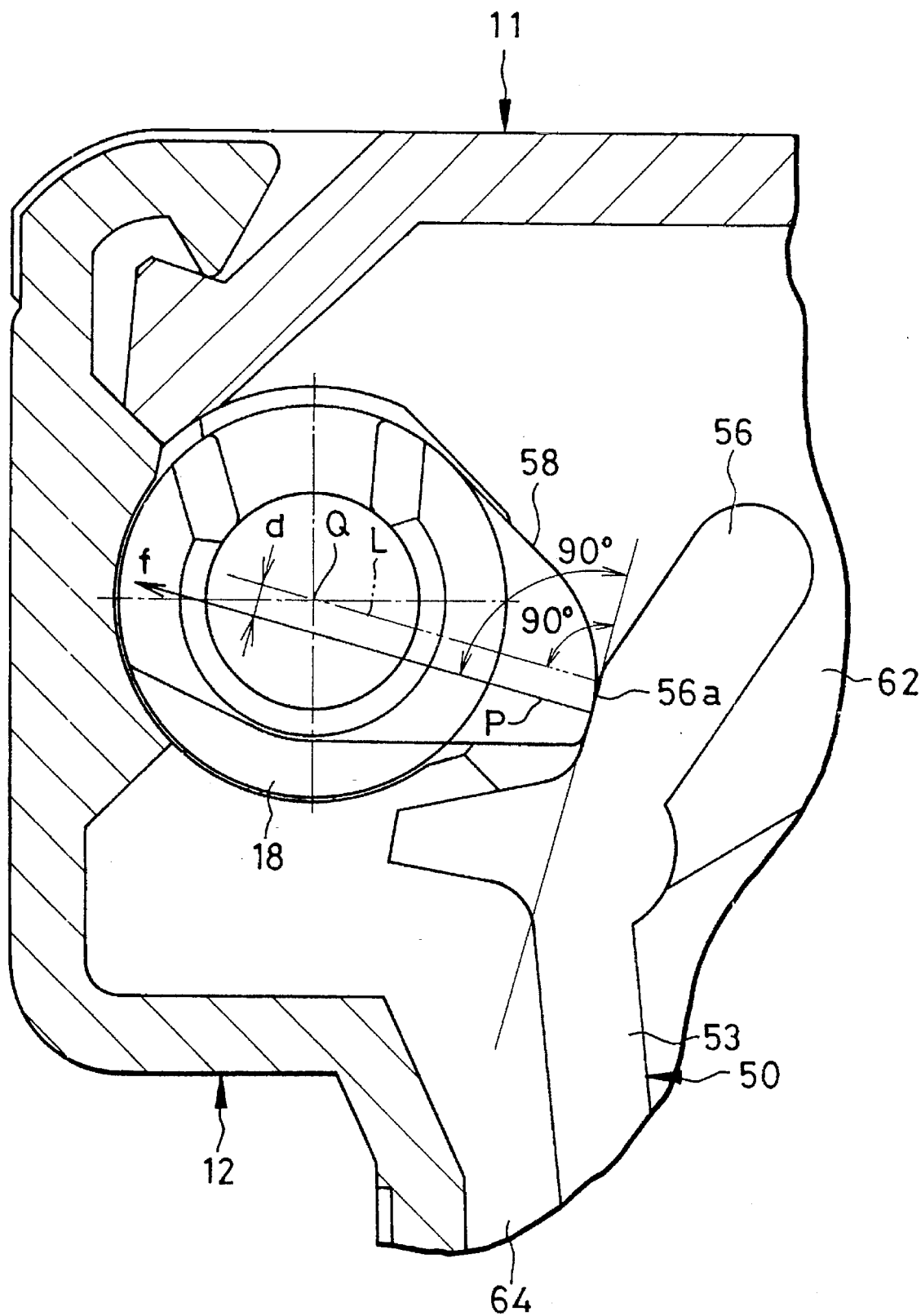
FIG. 3 is an enlarged sectional view illustrating the relationship between a cam follower surface of the locking member and a cam of the light-shielding door in the closed position of the door member.

As shown in FIGS. 2A and 2B, the locking member 50 is a single-piece part having a locking tooth 51 formed on a support portion 52 and first and second resilient arms 53 and 54 formed on opposite ends of the supporting portion 52. As shown in detail in FIG. 3, a free end 56 of the first arm 53 has a flat cam follower surface 56a. When the light-shielding door 18 is in the closed position as shown in FIGS. 2A and 3, the cam follower surface 56a is brought into contact with a distal end of a cam 58 which is formed integrally with the light-shielding door 18. In this position, a force f is applied from the locking member 50 to the cam 58 along a normal line P which extends from a contact point between the cam follower surface 56a and the cam 58 vertically to the cam follower surface 56a. The normal line P is displaced a distance d from a line L which is vertical to the flat cam follower surface 56a and extends across a rotary axis Q of the light-shielding door 18. Accordingly, a torque f×d is applied to the light-shielding door 18 in a direction to rotate the light-shielding door 18 to the closed position, so the light-shielding door 18 may not unexpectedly open.

The force f should preferably be in a range from $0.5 \leq f \leq 100$ (gf), more preferably from $1 \leq f \leq 50$ (gf). The distance d should preferably be in a range from $0.1 \leq d \leq 2$ (mm), more preferably from $0.15 \leq d \leq 1.5$ (mm), and most preferably from $0.2 \leq d \leq 1$ (mm). The value f×d should preferably be in a range from $0.05 \leq f \times d \leq 200$ (gf·mm), more preferably from $0.1 \leq f \times d \leq 120$ (gf·mm), and most preferably from $0.2 \leq f \times d \leq 50$ (gf·mm).

If any of the above parameters f, d and f×d is less than the above mentioned smallest value, the torque applied from the locking member 50 onto the light-shielding door 18 is too small to reliably secure the light-shielding door 18 closed. If any of the above parameters f, d and f×d is more than the above mentioned largest value, the friction between the flat cam follower surface 56a and the cam 58 and thus the torque necessary for opening or closing the light-shielding door 18 increase so much that the light-shielding door 18 would not move smoothly.

Figure 4:
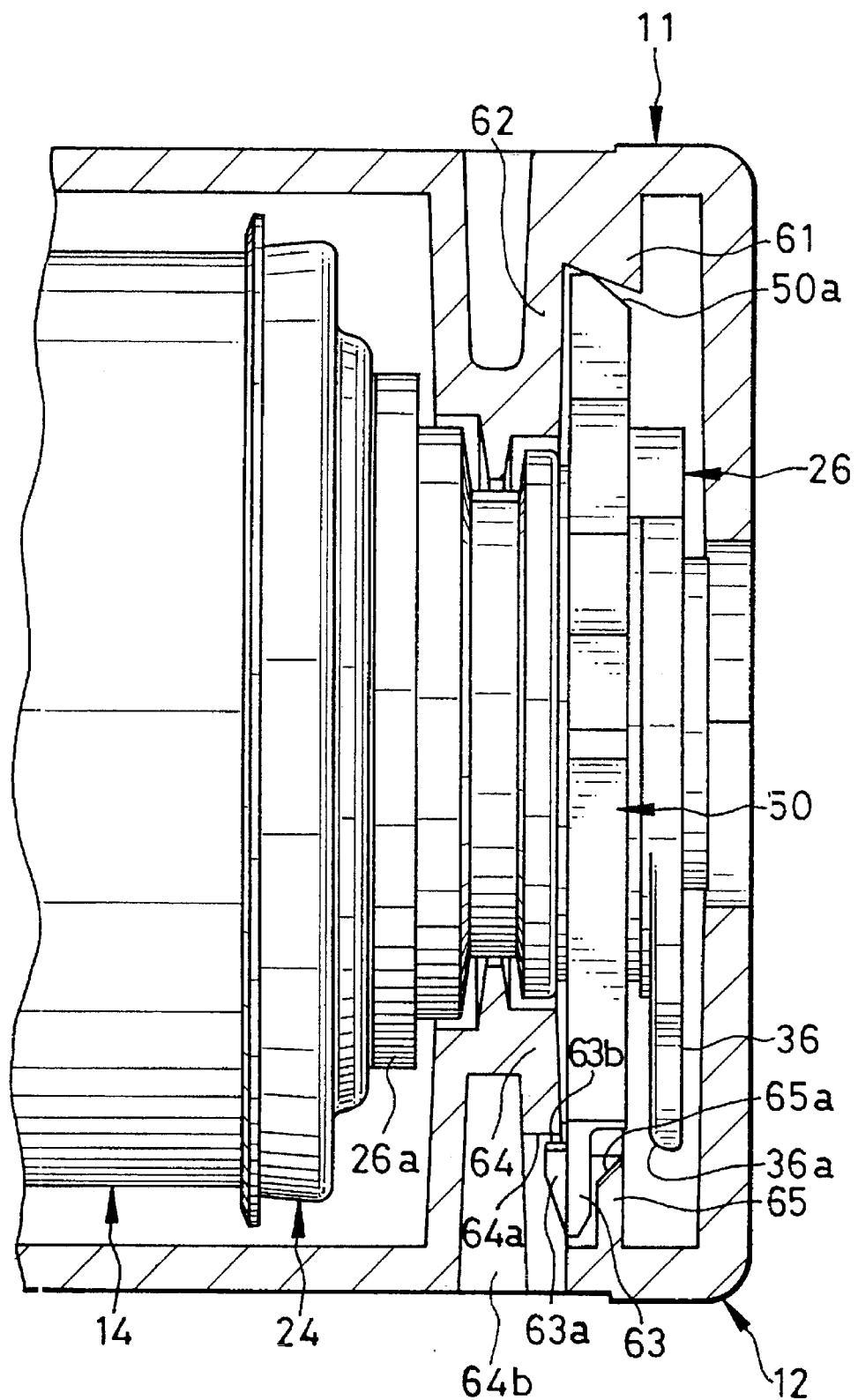
FIG. 4 is a fragmentary view, partly in section, of the photographic film cassette of FIG. 1, illustrating the engagement of the locking member with the cassette shell.

The second arm 54 has a click 54a at its distal end. The click 54a interlocks with a protrusion 61 having two angled sides 61a and 61b which is formed on an inner surface of the upper shell half 11. As shown in FIG. 4, the angled sides 61a and 61b of the protrusion 61 have acute-angle edges so that a V-shaped groove is formed between the protrusion 61 and an inner positioning wall 62 abutting on the protrusion 62. The click 54a can slide along the V-shaped groove. When the light-shielding door 18 is in the closed position as shown in FIG. 2A, the click 54a is engaged with the angled side 61a which is disposed farther from the light-shielding door 18. Thus, the support portion 52 is biased toward the spool core 22 due to the resiliency of the second arm 54, and the locking tooth 51 is urged to be engaged with the gear 35. When the light-shielding door 18 is in the open position, as shown in FIG. 2B, the click 54a is brought into contact with the other angled side 61b of the protrusion 61. As a result, the supporting portion 52 is released from the force toward the spool core 22, and the locking tooth 51 is disengaged from the gear 35.

Figure 5A:
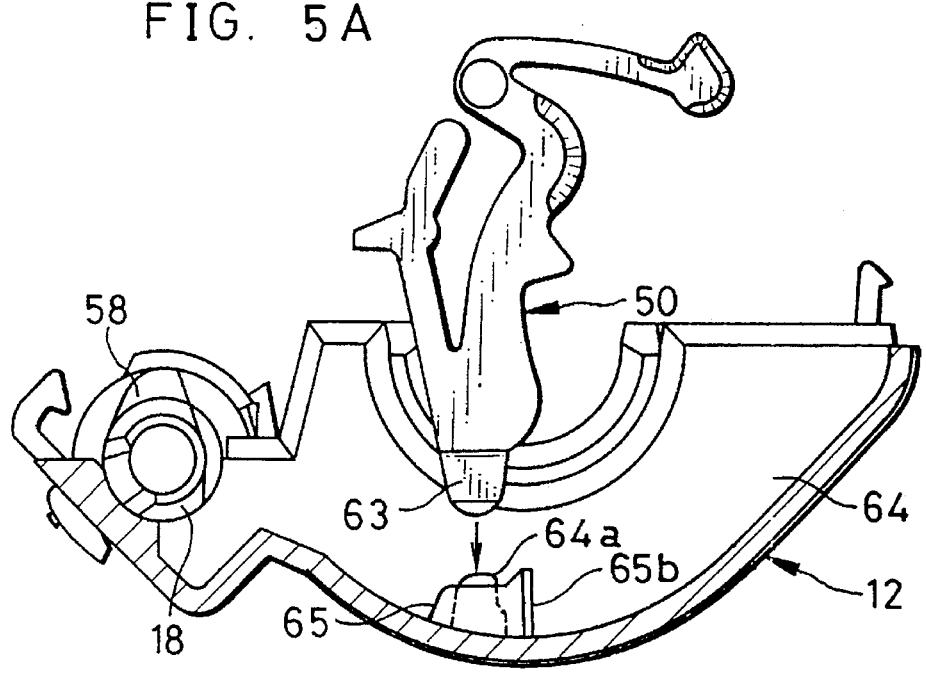
FIG. 5A is an explanatory sectional view illustrating the locking member being about to be assembled.

The locking member 50 is secured to the cassette shell 13 through an engagement of a hook 63a of a pivot protuberance 63, which is formed on the corner between the support portion 52 and the first arm 53, with a niche or recessed portion 64a formed in an inner positioning wall 64 of the lower shell half 12. The inner positioning walls 62 and 64 hold the spool 15 rotatably therebetween while positioning the spool 15 in the axial direction. A confining wall 65 is formed parallel to the inner positioning wall 64 in opposition to the niche 64a. When mounting the locking member 50 to the lower shell half 12, the pivot protuberance 63 is inserted between the inner positioning wall 64 and the confining wall 65 in a direction from a rotational center of the cassette shell 13, as is shown in FIG. 5A, until the pivot protuberance 63 comes into contact with the inner surface of the lower shell half 12 at the bottom of the niche 64a.

An end of the confining wall 65, from which the pivot protuberance 63 is inserted, is tapered off so as to facilitate receiving the pivot protuberance 63 and guide the same toward the niche 64a. The inner positioning wall 64 has hollows between reinforcing ribs 64b. The hook 63a is tapered off to a tip of the pivot protuberance 63 and has a hooking edge 63b on the side of the support portion 52, so that the hooking edge 63b is caught on a margin of the niche 64a when the pivot protuberance 63 is completely inserted between the walls 64 and 65, as is shown in FIGS. 5B and 5C.

Figure 5B:
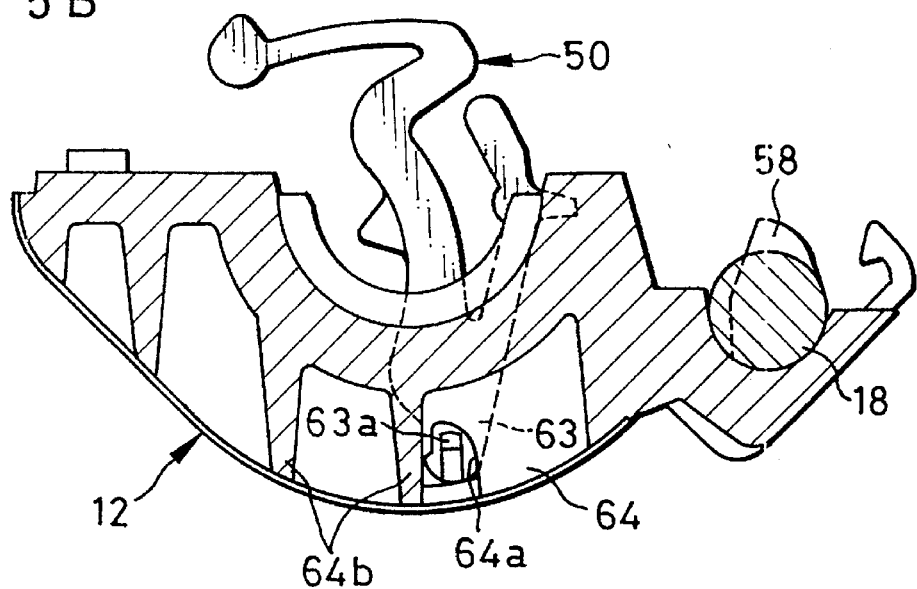
FIG. 5B is a sectional view illustrating the locking member in an initial assemble position, viewed from the opposite side to FIG. 5A.
Figure 5C:
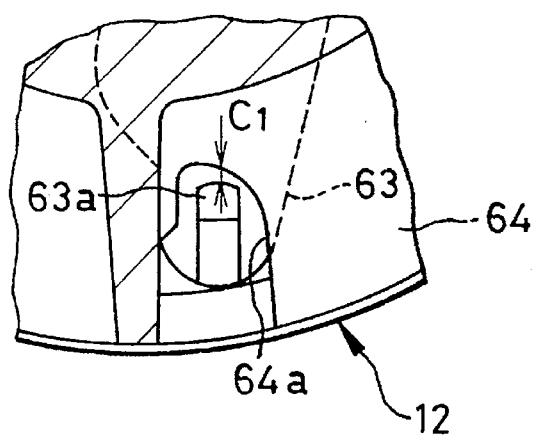
FIG. 5C is an enlarged view illustrating the relationship between a hook of the locking member and a hole of the cassette shell in the initial assemble position.
Figure 6A:
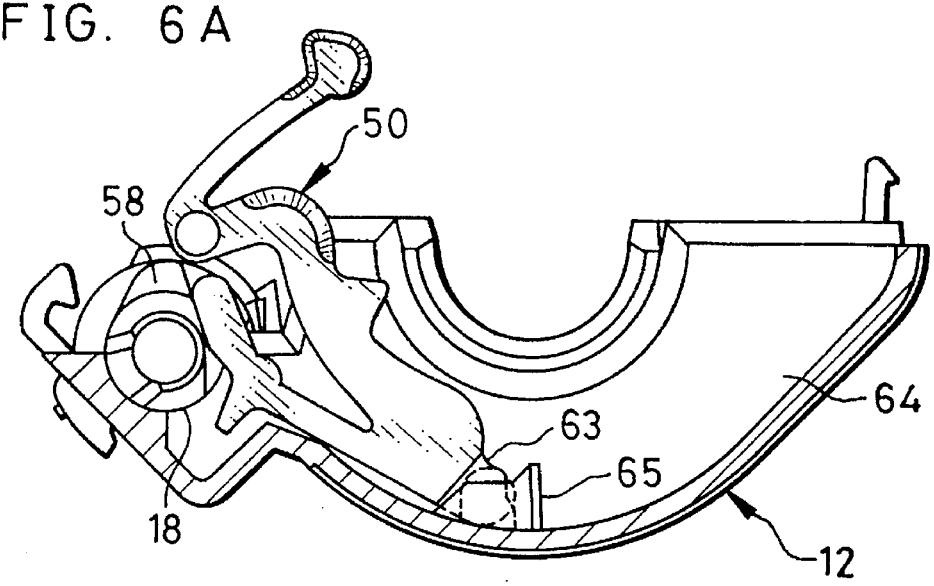
FIG. 6A is a sectional view illustrating the locking member in a final assemble position, viewed from the same side as FIG. 5A.
Figure 6B:
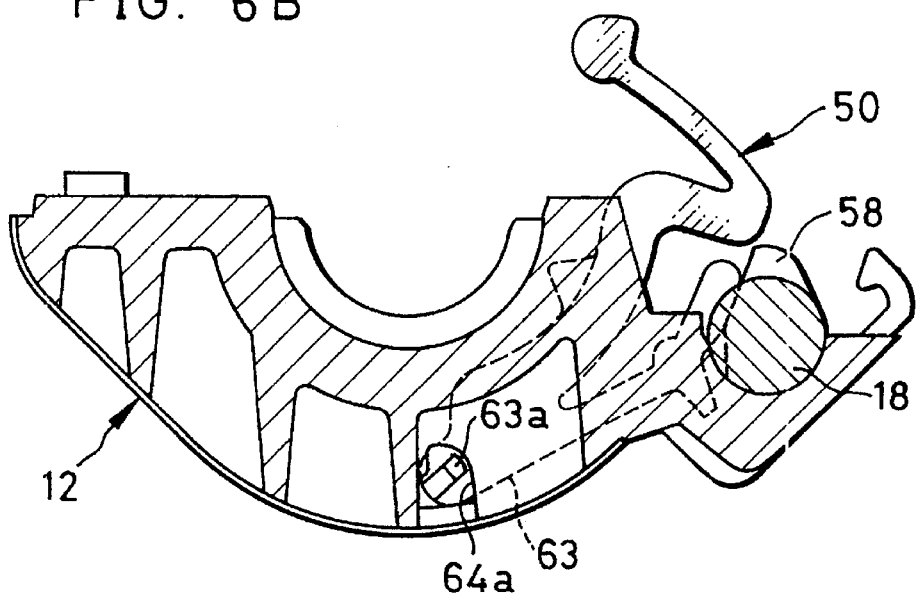
FIG. 6B is a sectional view illustrating the locking member in the final assemble position, viewed from the opposite side to FIG. 5A.
Figure 6C:
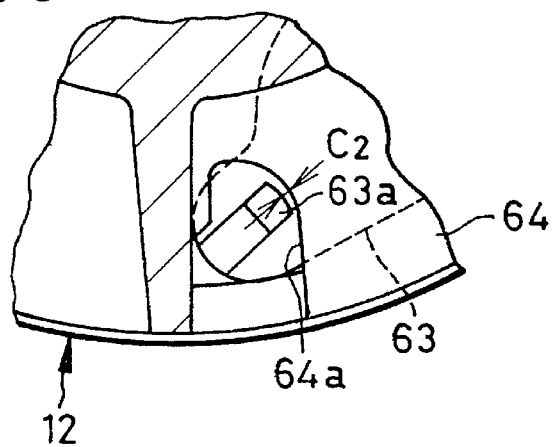
FIG. 6C is an enlarged view illustrating the relationship between the hook of the locking member and the hole of the cassette shell in the final assemble position.

Thereafter, the locking member 50 is rotated about the pivot protuberance 63 from the initial assemble position shown in FIGS. 5B and 5C to the final assemble position shown in FIGS. 6A to 6C where the locking member 50 comes into contact with the cam 58 of the light-shielding door 18, as is shown in FIGS. 6A to 6C, thereby completing mounting the locking member 50. The hooking edge 63b and the margin of the niche 64a are of arc-shape for smooth pivotal movement of the locking member 50. As will be seen from comparison of FIG. 6C with FIG. 5C, a clearance C1 between the hook 63a and the niche 64a in the initial assemble position is larger than a clearance C2 between the hook 63a and the niche 64a in the final assemble position. Accordingly, the locking member 50 can be easily mounted to the cassette shell 13 without the need for accurate positioning control. Once the locking member 50 is set in the final assemble position, the locking member can operate stably and properly.

The clearance C1 should preferably be in a range from $0.1 \leq C1 \leq 1$ (mm), and more preferably from $0.15 \leq C1 \leq 0.5$ (mm).

Below this range, a high positioning accuracy is necessary for inserting the locking member 50 in the niche 64a. Above this range, fluctuation of the locking member 50 is not negligible.

The clearance C2 should preferably be in a range from $0 \leq C2 \leq 0.5$ (mm), and more preferably from $0.05 \leq C1 \leq 0.3$ (mm).

Below this range, the locking member 50 cannot smoothly pivot in the niche 64a. Above this range, fluctuation of the locking member 50 is not negligible.

Figure 7:
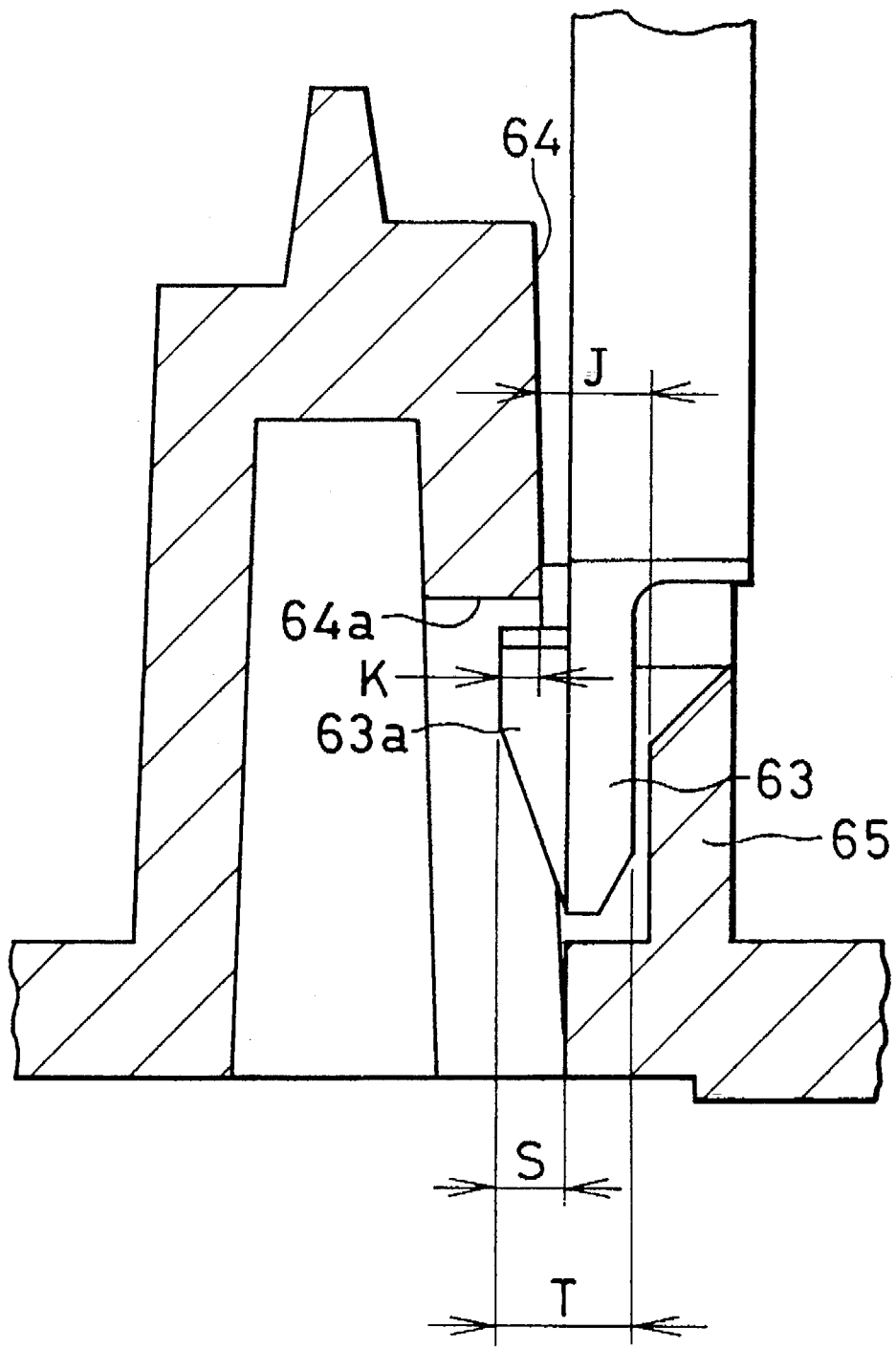
FIG. 7 is an enlarged view illustrating the relationship between the hook of the locking member and the hole of the cassette shell.

Other dimensions relating to the engagement between the hook 63a and the niche 64a, as shown in FIG. 7, may be defined as follows:

J=0.4 to 1.2 mm

T=0.4 to 1.5 mm

S=0.1 to 1 mm

K=0.05 to 1 mm wherein J is a distance between the inner positioning wall 64 and the confining wall 65; T is a thickness of the pivot protuberance 63 and the hook 63a in total; S is a thickness of the hook 63a; and K is an effective engaging amount.

Table 1 shows preferable dimensional ranges of the locking member 50. Table 2 shows more preferable dimensional ranges of the locking member 50.

TABLE 1

PREFERABLE DIMENSIONS OF THE LOCKING MEMBER

|  | FIRST ARM | SECOND ARM |
| --- | --- | --- |
| THICKNESS IN BENDING DIRECTION (mm) | $0.3 \leq h1 \leq 1.5$ | $0.3 \leq h2 \leq 1.5$ |
| WIDTH (perpendicular to the bending direction) (mm) | $0.3 \leq b1 \leq 2$ | $0.3 \leq b2 \leq 2$ |
| GEOMETRICAL MOMENT OF INERTIA (mm$^4$) | $0.005 \leq I1 \leq 0.4$ | $0.005 \leq I2 \leq 0.4$ |
| MODULUS OF DIRECT ELASTICITY (KGF/mm$^2$) | $100 \leq E1 \leq 700$ | $100 \leq E2 \leq 700$ |
| LENGTH (mm) | $3 \leq L1 \leq 8$ | $4 \leq L2 \leq 9$ |
| DEFLECTION AT THE ACTING POINT (mm) | $0.05 \leq v1 \leq 3$ | $0.1 \leq v2 \leq 3$ |
| SPRING CONSTANT (gf/mm) | $10 \leq k1 \leq 2000$ | $10 \leq k2 \leq 1500$ |
| COEFFICIENT OF FRICTION | $0.05 \leq \mu1 \leq 50.7$ (to the cam 58) | $0.05 \leq \mu2 \leq 0.7$ (to the protrusion 61) |

TABLE 2

MORE PREFERABLE DIMENSIONS OF THE LOCKING MEMBER

|  | FIRST ARM | SECOND ARM |
| --- | --- | --- |
| THICKNESS IN BENDING DIRECTION (mm) | $0.5 \leq h1 \leq 1.3$ | $0.5 \leq h2 \leq 1.2$ |
| WIDTH (perpendicular to the bending direction) (mm) | $0.6 \leq b1 \leq 1.5$ | $0.6 \leq b2 \leq 1.5$ |
| GEOMETRICAL MOMENT OF INERTIA (mm$^4$) | $0.01 \leq I1 \leq 0.3$ | $0.01 \leq I2 \leq 0.2$ |
| MODULUS OF DIRECT ELASTICITY (kgf/mm$^2$) | $150 \leq E1 \leq 500$ | $150 \leq E2 \leq 500$ |
| LENGTH (mm) | $4 \leq L1 \leq 7$ | $5 \leq L2 \leq 8$ |
| DEFLECTION AT THE ACTING POINT (mm) | $0.1 \leq v1 \leq 2$ | $0.15 \leq v2 \leq 2$ |
| SPRING CONSTANT (gf/mm) | $100 \leq k1 \leq 1000$ | $50 \leq k2 \leq 500$ |
| COEFFICIENT OF FRICTION | $0.1 \leq \mu1 \leq 0.6$ (to the cam 58) | $0.1 \leq \mu2 \leq 0.6$ (to the protrusion 61) |

With respect to thicknesses h1 and h2 of the first and second arms 53 and 54, the curving or bending direction of the arms 53 and 54 are shown in FIG. 2A.

If any of the above dimensions is below the above range, the stiffness of the locking member 50 becomes too small to lock the spool 15 stationary. If any of the above dimensions is over the above range, the stiffness becomes so large that the locking member 50 will not move smoothly. The relative magnitudes of some of the above dimensions are preferably as follows:

$I1 \geq I2$ $E1 \cdot I1 \geq E2 \cdot I2$ $L1 \leq L2$ $v1 \leq v2$ $k1 \geq k2$ The support portion 52 of the locking member 50 preferably has a stiffness (geometrical moment of inertia, spring constant) which is more than twice as large as those of the first and second arms 53 and 54.

The indication flag 36 of the ring unit 26 preferably has a thickness of 0.3 to 1.5 mm, and more preferably 0.5 to 0.8 mm, in view of moldability. As shown in FIG. 2A, those edges 50a, 50b and 50c of the locking member 50 which might interfere with the indication flag 36 are rounded or chamfered by an amount of 0.1 to 1 mm. Also, those portion 65b of the confining wall 65 which might interfere with the indication flag 36 is rounded or chamfered by an amount of 0.1 to 1 mm. As shown in FIG. 4, the indication flag 36 itself is rounded along its fringe by an amount of 0.1 to 1 mm, so as not to interfere with the locking member 50. The clearance between the indication flag 36 and the locking member 50 is preferably set in a range from 0.1 to 1 mm, and more preferably from 0.2 to 0.7 mm.

Now, the operation of the photographic film cassette 10 having the locking member 50 will be described.

When the light-shielding door 18 is in the closed position as shown in FIG. 2A, the click 54a is engaged with the angled side 61a, and the cam follower surface 56a is brought into contact with the distal end of the cam 58. Because the first and second arms 53 and 54 are compressed in this position, the cam follower surface 56a and the click 54a are pressed onto the distal end of the cam 58 and the angled side 61a, respectively. Consequently, the support portion 52 is biased toward the spool core 22 to engage the locking tooth 51 with the gear 35. Also, the light-shielding door 18 is biased toward the closed position. Therefore, the light-shielding door 18 does not accidentally open.

When the photographic film cassette 10 is loaded in a camera and the camera lid is closed, a specific drive shaft of the camera is engaged in the key hole 20 or 21 of the light-shielding door 18, and a spool drive shaft of the camera is engaged in the key hole 32 or 33 of the spool core 22. In response to rotation of the specific drive shaft, the light-shielding door 18 is rotated from the closed position to the open position. Then, the cam 58 is disengaged from the cam follower surface 56a, so the first arm 53 recovers its original shape. Thereafter the spool core 22 is rotated by the spool drive shaft in the unwinding direction or film advancing direction, that is, a counterclockwise direction in FIGS. 2A and 2B. Then, the locking tooth 51 is pushed out by the gear 35 to move the support portion 52 and thus the second arm 54 toward the light-shielding door 18. As a result, the click 54a passes over the protrusion 61 from one angled side 61a into the other angled side 61b.

In this way, the locking tooth 51 is kept away from the gear 35, as is shown in FIG. 2B, and the spool core 22 is free to rotate. In this position, a clearance D1 of 0.05 to 1 mm is provided between the distal end 56 of the first arm 53 and the cam 58, and also a clearance D2 of 0.05 to 1 mm is provided between the click 54a and the angled side 61b of the protrusion 61. That is, no load is applied to either of the first and second arms 53 and 54, so the arms 53 and 54 have no deflection. The niche 64a is sized smaller than the pivot protuberance 63 so that the pivot protuberance 63 may not catch in the niche 64a to disable the locking member 50 from pivoting.

Although the locking member 50 of the above-described embodiment is mounted to the cassette shell 13 through the engagement of the hook 63a of the locking member 50 with the niche 64a of the inner positioning wall 64 of the lower shell half 12, it is possible to form a hook on the inner positioning wall 64 while forming a recess or a hole in the pivot protuberance 63 of the locking member 50.

Figure 8:
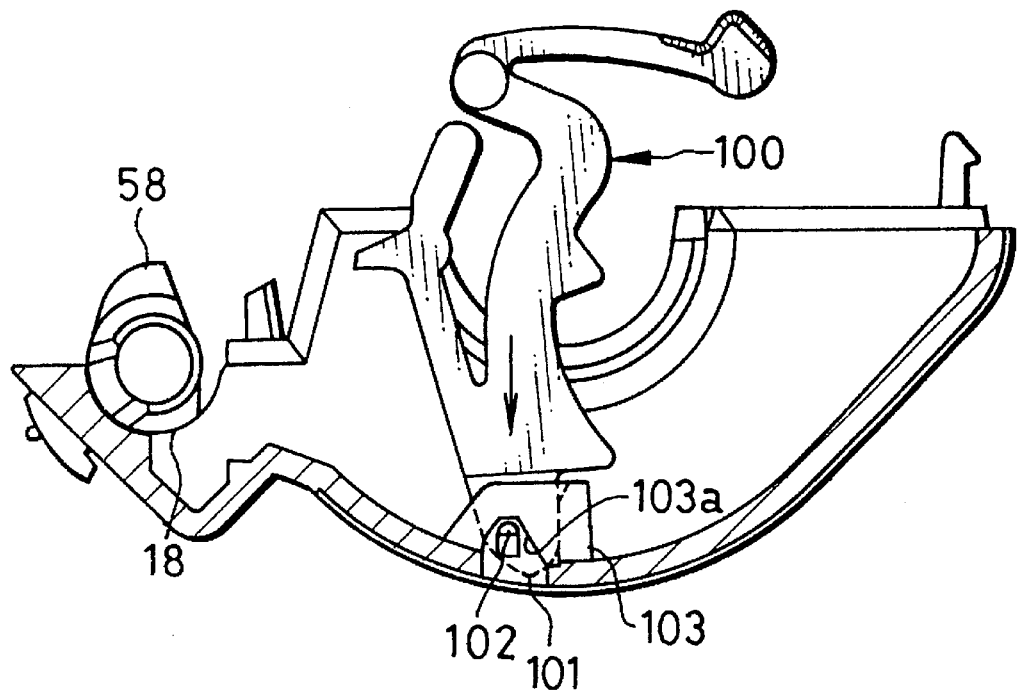
FIG. 8 is a sectional view illustrating a locking member in an initial assemble position, according to another embodiment of the invention.

In an alternative as shown in FIG. 8, a hook 102 similar to the hook 63a is formed on the side of a locking member 100 which faces a confining wall 103, while a hole 103a is formed through the confining wall 103 so that the hook 102 is engaged in the hole 103a. In FIG. 8, an arrow shows an initial mounting direction of the locking member 100. After the hook 102 is engaged in the hole 103a by inserting the locking member 100 in this initial mounting direction, the locking member 100 is rotated about the hook 102 into a final assembled position in the same way as in the first embodiment.

Figure 9:
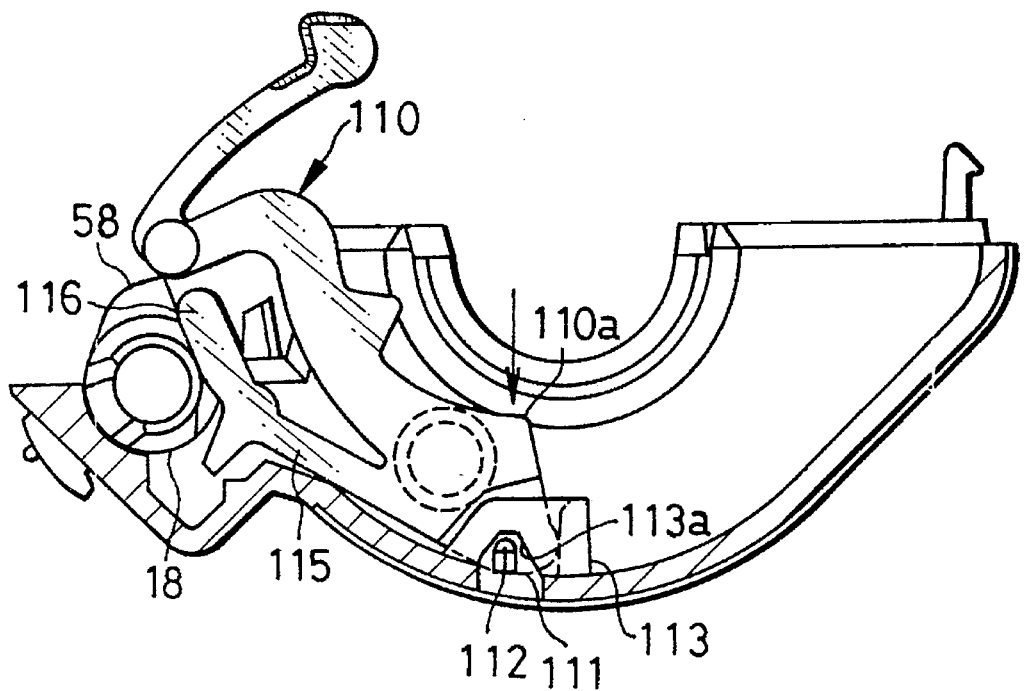
FIG. 9 is a sectional view illustrating the locking member in a final assemble position according to another embodiment of the invention.
Figure 10:
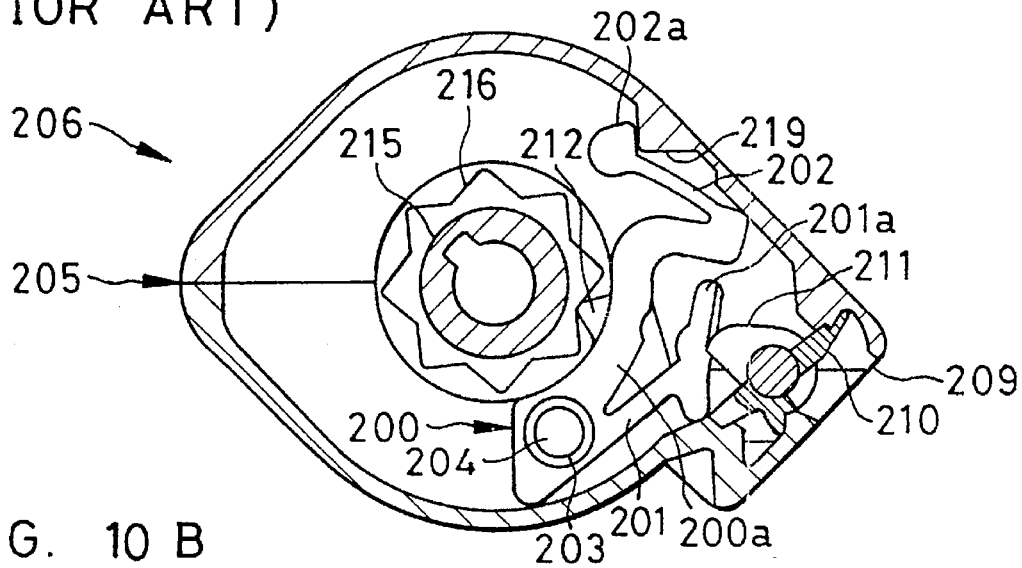
FIGS. 10A, 10B and 10C are sectional views illustrating a known spool lock mechanism.
Figure 10:
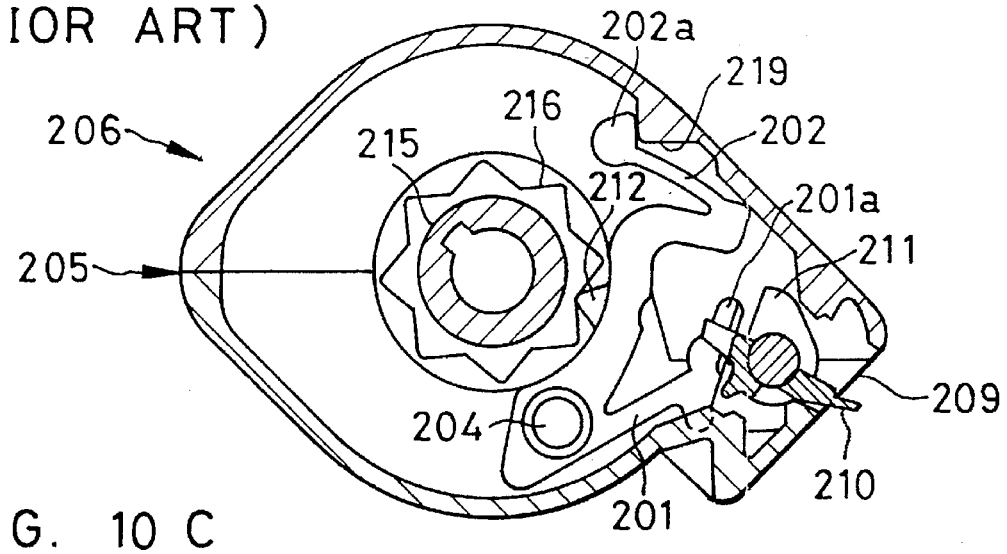
Figure 10:
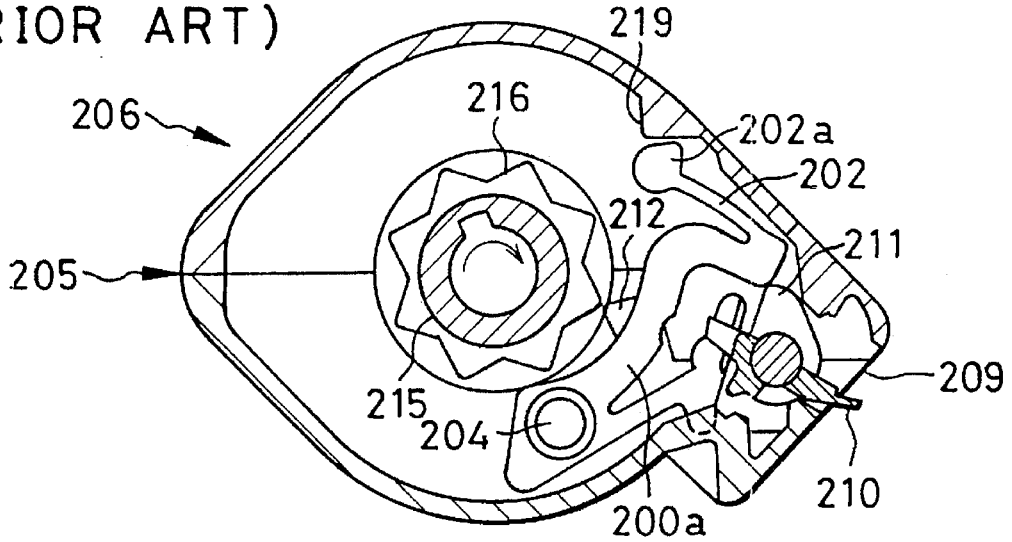
Figure 11A:
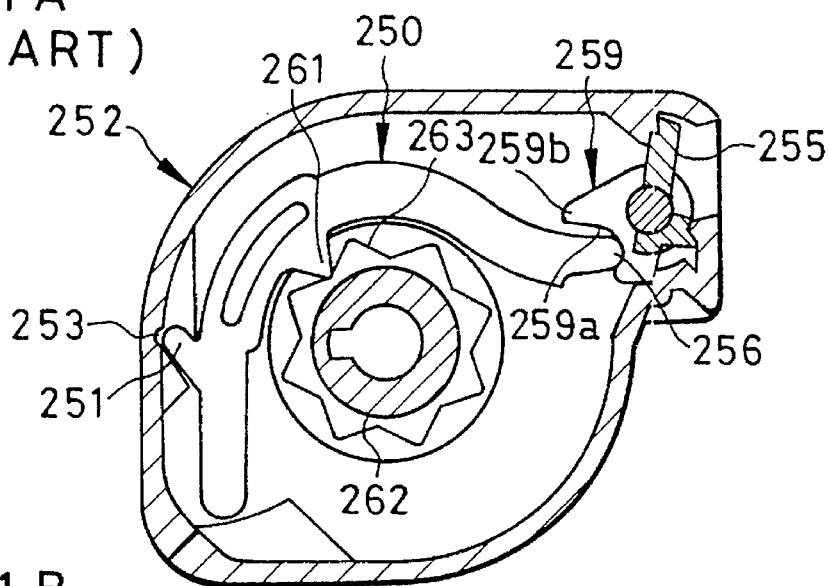
FIGS. 11A, 11B and 11C are sectional views illustrating another known spool lock mechanism.
Figure 11B:
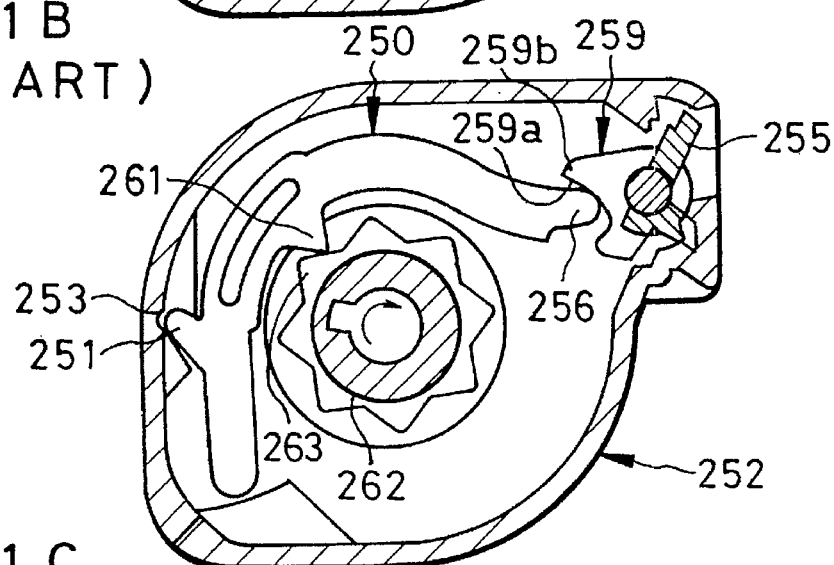
Figure 11C:
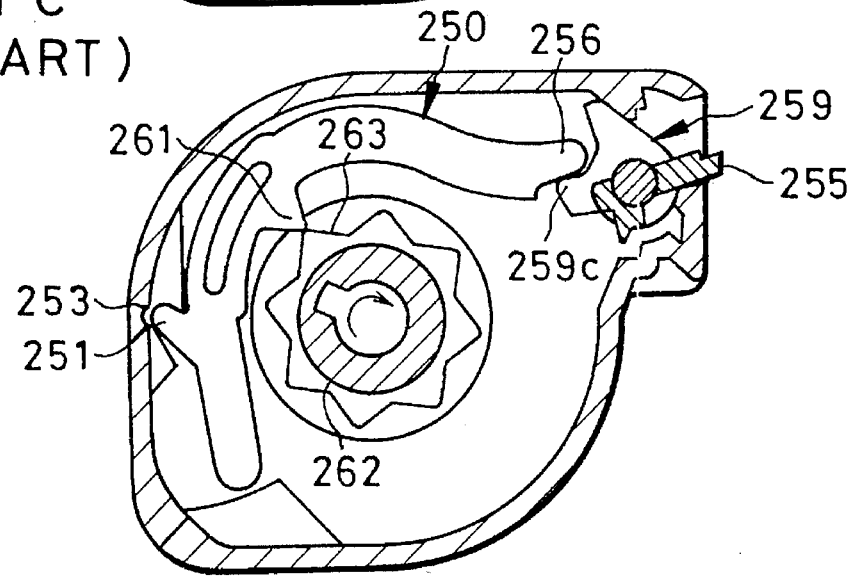

FIG. 9 shows another embodiment of the invention, wherein a locking member 110 has a hook 112 formed on the side of a pivot protuberance 111 that faces a confining wall 113, so as to engage in a hole 113a formed through the confining wall 113, like the embodiment shown in FIG. 8. However, the locking member 110 is adapted to be mounted directly into a position wherein a free end 116 of a first arm 115 is in contact with a cam 58 of a light-shielding door 18. By pushing down at a shoulder 110a, the hook 112 of the locking member 110 is firmly engaged in a hole or recess 113a of the confining wall 113.

The locking member according to the invention may be formed from one of the following commercially available resin materials: RESIN #3350 (Phillips Oil Co.), Denka Styrole PSM991Y-14 (Denki Kagaku Kogyo Co.) and Mitsubishi Polytec YH061-00802 (Mitsubishi Chemical Co.). Respective properties are shown in Table 3.

TABLE 3

| PROPERTIES [UNIT] (METHOD OF MEASUREMENT) | RESIN #3350 | DENKA STYROLE PSM991Y-14 | MITSUBISHI POLYTEC YH061-00802 |
|---|---|---|---|
| TENSILE STRENGTH AT YIELD POINT [kg/cm$^2$] (ASTM D-638) | 250 | 290 | 280 |
| STAIN UNDER TENSION [%] (ASTM D-638) | 49 | 45 | 44 |
| IZOD IMPACT STRENGTH [kg-cm/cm] (ASTM D-256) | 8.3 | 5.9 | 6.4 |
| FLEXURAL STRENGTH [kg/cm$^2$] (ASTM D-790) | 490 | 530 | 510 |
| FLEXURAL MODULUS [kg/cm$^2$] (ASTM D-790) | 22,100 | 26,500 | 24,500 |
| VICAT SOFTENING POINT (JIS K-6871) [°C.(1 kg LOAD)] | 98 | | |
| [°C.(5 kg LOAD)] | 90 | 97 | 93 |
| HEAT DISTORTION | 79 | 82 | 81 |

TABLE 3-continued

| PROPERTIES [UNIT] (METHOD OF MEASUREMENT) | RESIN #3350 | DENKA STYROLE PSM991Y-14 | MITSUBISHI POLYTEC YH061-00802 |
|---|---|---|---|
| TEMPERATURE[°C. (18.6 kg LOAD)] (ASTM D-648) | | | |
| ROCKWELL HARDNESS [M-SCALE] (ASTM D-785) | 33 | 40 | 36 |
| MELT FLOW RATE [G/10 MIN] (ASTM D-1238) (200° C., 5 kg LOAD) | 5.3 | 4.3 | 4.7 |
| RUBBER CONTENT [%] | 7.2 | 4.4–5.0 | 5.7–6.4 |
| NUMBER-AVERAGE DIAMETER OF RUBBER PARTICLES [μm] (dn) | 0.95 | 1.48 | 0.9 |
| VOLUME-AVERAGE DIAMETER OF RUBBER PARTICLES [μm] (dv) | 1.92 | 2.34 | 1.34 |
| WEIGHT-AVERAGE MOLECULAR WEIGHT [×10$^4$] (MW) | 19.35 | 20.4 | 20.8 |
| CARBON BLACK CONTENT [%] | | 0.5 | 1.0 |
| SILICONE CONTENT [%] | | 2.0 | 2.0 |

In view of mass-productivity, price and so forth, the resin for forming the cassette shell should preferably be a thermoplastic resin containing carbon black as light screen agent in a percentage from 0.05 wt % to 3.00 wt %. According to necessity, the resin may contain a lubricant such as silicone oil, an antistatic agent, an inorganic or organic pigment such as titanium oxide, a processing aid, an antioxidant, a nucleating agent, and a plasticizer.

Preferred examples of the resin include polystyrene resin, shock-resistant polystyrene resin, styrene-acrylonitrile-copolymer resin, styrene-acrylonitrile-butadiene copolymer resin, polypropylene resin, high density polyethylene resin, polyethylene-terephthalate resin, polycarbonete resin, polyvinyl chloride resin, and modified resin thereof. In view of dimensional accuracy, physical strength, ultrasonic-weldability and other advantages, one of the most preferred examples is shock-resistant polystyrene resin containing 0.1 to 10 wt % synthetic rubber, which has a melt flow rate from 1.0 to 10.0 g/10 minutes, preferably from 2.0 to 8.0 g/10 minutes, and more preferably from 2.5 to 7 g/10 minutes. As other necessary properties of this resin, modulus in flexture is preferably from 15,000 to 30,000 Kg/cm$^2$, more preferably from 18,000 to 28,000 Kg/cm$^2$, and most preferably from 20,000 to 28,000 Kg/cm$^2$, and Vicat softening point (15 kg weight) is preferably less than 80° C., more preferably less than 85° C., and most preferably less than 90° C.

The carbon black is loaded in the resin for ensuring light-shielding function. Carbon blacks may be classified according to production method into furnace black, channel black, thermal carbon black, and so forth, of which preferred are furnace blacks having an average particle diameter from 10 mμ to 80 mμ and PH5 to PH9, and more preferred are furnace blacks having an average particle diameter from 15 mμ to 50 mμ and PH6 to PH8, because these have smaller unfavorable effect on the photographic film, such as fogging and disordering of sensitivity of the photographic film, but can provide sufficient light-shielding effect.

Representative examples of preferred carbon blacks on the market include Carbon Black #20(B), #30(B), #33(B), #40(B), #41(B), #44(B), #45(B), #50(B), #55(B), #100, #600(B), #2200, #2400(B), MA8, MA11 and MA100, all produced by Mitsubishi Kasei Corporation; Black Pearls 2, 46, 70, 71, 74, 80, 81 and 607, Regal 300, 330, 400, 660, 991 and SRF-S, Vulcan 3 and 6, Sterling 10, SO, V, S, FT-FF and MT-FF, all produced by Cabot Corp.; and United R, BB, 15, 102, 3001, 3004, 3006, 3007, 3008, 3009, 3011, 3012, XC-3016, XC-3017 and 3020, all produced by Ashland Chemical Co. However, the carbon black is by no means limited to these example.

Furnace black particle of less than 10 mμ diameter is unsuitable for kneading, so that light-shielding ability and physical strength will be low. Above 100 mμ, dispersing quality is superior, but light-shielding ability is inferior. Increasing density of carbon black enough to compensate for the inferior light-shielding ability resulted in lowering physical strength and moldability so bad that the products was hardly useful in practice. Most carbon blacks beyond the range from PH5 to PH9 were not applicable because they were liable to adversely affect photographic properties.

To evade adverse influence on the photographic properties of the photographic film, free sulfur component of the above-described carbon black should be 0.6% or less, preferably 0.3% or less, and more preferably 0.1% or less. Cyanogen compound component should be 0.01% or less, preferably 0.005% or less, and more preferably 0.001% or less. Aldehyde compound component should be 0.1% or less, preferably 0.05% or less, and more preferably 0.01% or less. It is necessary to pay attention to the fact that even a small amount of these objects have bad effect on photographic properties.

Loading of the furnace carbon black is preferably 0.05 wt % to 3.00 wt %, in the interest of light-tightness, moldability and physical strength of the cassette shell 13. Loading of less than 0.05 wt % results in insufficient light-shielding ability. Loading of more than 3.00 wt % results in lowering physical strength of the cassette shell 13 and increasing water absorption so much that weld-marks, silver streaking and other errors are liable to occur in injection-molding, which result in deterioration of appearance and surface strength.

As the light screen agent, inorganic pigment such as titanium oxide, redoxide, calcium carbide, etc. or organic pigment may be used in combination with the above-described carbon black.

To smooth the cassette shell, a lubricant is loaded in the resin before molding, or the molded product is coated with a lubricant. As lubricants, there are silicone oils, high fatty acid amid such as oleic acid amid and erucic acid amid, high fatty acid metal salt such as zinc stearate, higher alcohol ester, fatty acid ester of polyhydroxy alcohol ester, etc. But the lubricant for use in the invention is not limited to these examples.

Preferred examples of silicone oils to be loaded in the cassette shell are dimethylpolysiloxane and carboxyl-modified silicone oil which are disclosed in JPA 62-286043 or 62-284355. Loading of the silicone oil is from 0.05 wt % to 5.0 wt %, and preferably from 1.0 wt % to 3.0 wt %.

A loading of less than 0.05 wt % has little smoothing effect. A loading of more than 5.0 wt % may cause slipping between the resin and screws in an injection molding machine, thereby elongating molding cycles and also increasing the amount of silicone oil bleeding out to the product surface. The bled-out oil may be transferred to the photographic film contained in the cassette shell, and adversely affect photographic properties of the photographic film, like hindering developing agents from dispersing over the photographic film on photographic processing. In addition, weldability for ultrasonic-sealing of the joints between the upper and lower shell halves is lowered.

The viscosity of silicone oil is preferably from 1000 cs to 60,000 cs at 25° C. Viscosity of less than 1000 cs at 25° C. results in so large bleed-out that has bad effect on photographic properties. Silicone oil having a viscosity of above 60,000 cs is too difficult to knead into the resin to use in practice. Although there are many kinds of modified silicone oils, such as fluorine-modified silicone oil, on the market, most of them have bad effect on photographic properties of the photographic film, and were found to be inapplicable to the photographic film cassette for many reasons. That is, they cannot sufficiently smooth the resin, or cause remarkable thermal decomposition during inject-molding.

Antioxidant may be added to the resin in order to prevent oxidative destruction and other kinds of decomposition of the resin, and thus prevent generating decomposition products that adversely affect the photographic properties of the photographic film, e.g. alcohol, aldehyde, ketone, carboxylic acid etc.

Representative examples of the antioxidant for use in the present invention are described below.
(a) Phenol-based antioxidant (t stands for "tert"):
Vitamin E, vitamin E carboxylate, 6-t-butyl-3-methylphenyl derivatives, 2,6-di-t-butyl-p-cresol, 2,2'-methylenebis-(4-ethyl-6-t-butylphenol), 4,4'-butyridenebis(6-t-butyl-m-cresol, 4,4'-thiobis(6-t-butyl-m-cresol), 4,4'-dihydroxydiphenylcyclohexane, alkylated bisphenol, styrenated phenol, 2,6-di-t-butyl-3-methylphenol, n-octadecyl-3-(3',5'-di-t-butyl-4'-hydroxyphenyl) propionate, 2,2'-methylenebis(4-methyl-6-t-butylphenol), 4,4'-thiobis(3-methyl-6-t-butylphenol), 4,4'-butylidenebis(3-methyl-6-t-butylphenol), stearyl-β-(3,5-di-t-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene and terakis[methylene-3-(3,5-di-t-butyl-4'-hydroxyphenyl)propionate]methane.
(b) Ketone amine condensate-based antioxidant:
6-Ethoxy-2,2,4-trimethyl-1,2-dihydroquinoline, polymers of 2,2,4-trimethyl-1,2-dihydroquinoline and trimethyldihydroquinoline derivatives.

(c) Allylamine-based antioxidant:
Phenyl-α-naphthylamine, N-phenyl-β-naphthylamine, N-phenyl-N'-isopropyl-p-phenylenediamine, N,N'-dipheenyl-p-phenylenediamine, N,N'-di-β-naphthyl-p-phenylenediamine and N-(3'-hydroxybutylidene)-1-naphthylamine.
(d) Imidazole-based antioxidant:
2-Mercaptobenzoimidazole, zinc salt of 2-mercaptobenzoimidazole and 2-mercaptobenzoimidazole.
(e) Phosphite-based antioxidant:
Alkylated allylphosphite, diphenylisodecylphosphite, sodium tris(nonylphenyl)phosphite, tris(nonylphenyl) phosphite and triphenyl phosphite.
(f) Thiourea-based antioxidant:
Thiourea derivatives and 1,3-bis(dimethylaminopropyl)-2-thiourea.
(g) Other antioxidants useful for air oxidation:
Dilauryl thiodipropionate.
(h) Hindered phenol-based antioxidant:
1,3,5-Trimethyl-2,4,6-tris(3,5-di-t-butyl-4-hydroxybenzyl)benzene, tetrakis[methylene(3,5-di-t-butyl-4-hydroxy-hydrocinnamate]methane, octadecyl-3,5-di-t-butyl-4-hydroxy-hydrocinnamate, 2,2',2'-tris[(3,5-di-t-butyl-4-hydroxyphenyl)propionyloxy]isocyanurate, tetrakis (2,4-di-t-butyl-phenyl)-4,4'-biphenylene diphosphite, 4,4'-thiobis(6-t-butyl-o-cresol), 2,2'-thobis(6-tert-butyl-4-methlphenol), tris(2-methyl-4-hydroxy-5-t-butylphenol) butane, 2,2'-methylenebis(4-methyl-6-tert-butylphenol), 4,4'-methylenebis(2,6-di-t-butylphenol), 4,4'-butylidenebis (3-methyl-6-t-butylphenol), 2,6-di-t-butyl-4-methylphenol, 4-hydorxymethyl-2,6-di-t-butylphenol, 2,6-di-t-4-n-butylphenol, 2,6-bis(2'-hydroxy-3'-t-butyl-3'-methylbenzyl)-4-methylphenol, 4,4'-methylenebis(6-t-butyl-o-cresol) and 4,4'-butylidene-bis(6-t-butyl-m-cresol). Among these, preferred are antioxidants having a melting point of 100° C. or higher, and more preferably 120° C. or higher, because prevention effects on bleed out and thermal decomposition can be increased without very worsening photographic properties of the photographic film.

Representative examples of commercially available antioxidants are described below.
(1) Phenol-based antioxidant:
SUMILIZER BHT (Sumitomo), YOSHINOX BHT (Yoshitomi), IRGANOX 1076 (Ciba Geigy), MARK AO-50 (Adeca-Argus), SUMILIZER B-76 (Sumitomo), TOMINOX SS (Yoshitomi), IRGANOX 565 (Ciba Geigy), NONOX WSP (ICI), SANTONOX (Monsanto), SUMILIZER WX R (Sumitomo), ANTAGECRYSTAL (Kawaguchi), IRGANOX 1035 (Ciba Geigy), ANTAGE W-400 (Kawaguchi), NOCLIZER NS-6 (Ohuchi Shinko), IRGANOX 1425 WL (Chiba Geigy), MARK AO-80 (Adeca-Argus), SUMILIZER GA-80 (Sumitomo), TOPANOL CA (ICI), MARK AO-30 (Adeca-Argus), MARK AO-20 (Adeca-Argus), IRGANOX 3114 (Ciba Geigy), MARK AO-330 (Adeca-Argus), IRGANOX 1330 (Ciba Geigy), CYANOX 1790 (ACC), IRGANOX 1010 (Ciba Geigy), MARK AO-60 (Adeca-Argus), SUMILIZER BP-101 (Sumitomo) and TOMINOX TT (Yoshitomi).
(2) Phosphorus-based antioxidant:
IRGANOX 168 (Ciba Geigy), MARK 2112 (Adeca-Argus), WESTON 618 (Vorg-Warner), MARK PEP-8 (Adeca-Argus), ULTRANOX 626 (Vorg-Warner), MARK PEP-24G (Adeca-Argus), MARK PEP-36 (Adeca-Argus) and HCA (Sanko).
(3) Thioether-based antioxidant:
DLTDP "YOSHITOMI" (Yoshitomi), SIMILIZER TPL (Sumitomo), ANTIOX L (Nippon Oil), DMTD "YOSHI- TOMI" (Yoshitomi), SIMILIZER TPT (Sumitomo), ANTIOX M (Nippon Oil), DSTP "YOSHITOMI" (Yoshitomi), SIMILIZER TPS (Sumitomo), ANTIOX (Nippon Oil), SEENOX 412S (Sipro), MARK AO-412S (Adeca-Argus), SIMILIZER TP-D (Sumitomo), MARK AO-23 (Adeca-Argus), SANDSTAB P-EPQ (Sand), IRGANOX P-EPQ FF (Ciba Geigy), IRGANOX 1222 (Ciba Geigy), MARK 329K (Adeca-Argus), WESTON 399 (Vorg-Warner), MARK 260 (Adeca-Argus) and MARK 529A (AdecaArgus).

(4) Metal Deactivator

NAUGARD XL-1 (Uniroyal), MARK CDA-1 (Adeca-Argus), MARK CDA-6 (Adeca-Argus), IRGANOX MD-1024 (Ciba Geigy) and CUNOX (Mitusi Toatsu).

Preferred are phenol-based antioxidants, and more preferred are hindered phenol-based antioxidants. Commercially available phenol-based antioxidants include IRGANOX series products of Ciba Geigy, SIMILIZER BHT, SIMULIZER BH-76, SUMILIZER WX-R and SUMILIZER BP-101 of Sumitomo Chemical Co., Ltd.

It is effective to use one or more, particularly two or more of 2,6-di-t-butyl-p-cresol (BHT), a low-volatile and high molecular weight hindered phenol-based antioxidant (e.g., IRGANOX 1010, IRGANOX 1076, TOPANOL CA, IONOX 330, all trade names), dilauryl thiodipropionate, distearylthiopropionate and dialkyl phosphate in combination. Since antioxidant is a reducing agent which adversely affects photographic materials, it is necessary to carefully examine its kind and the compounding amount so that degradation of photographic materials may not become a great problem, but its preventing effect against thermal decomposition may be maintained sufficient. In view of this, it is preferable to use phosphorus-based and phenol-based antioxidants, and more preferably hindered phenol-based antioxidants, because these have not much unfavorable effects on the photographic film, such as fogging and disordering of photosensitivity. Among of hindered phenol-based antioxidants, preferred are those having a melting point of 100° C. or higher, and more preferred are 120° C. or higher. It is most preferable to use two or more of the above-described phenol-based and phosphrus-based antioxidants in combination.

In particular, because the anti-oxidant act is synergically activated by light screen agents such as carbon black, it is preferable to use the above-described phenol-based and phosphorus-based antioxidants in combination with carbon black.

In addition, various antioxidants disclosed in *Plastic Data Handbook*, published by KK Kogyo Chosa-Kai, pp. 794–799, various antioxidants disclosed in *Plastic Additives Data*, issued by KK Kagaku Kogyo Sha, pp. 327–329 and various antioxidants disclosed in *Plastic Age Encyclopedia, Advanced Version*, issued by KK Plastic Age, pp. 211–212 (1986) may be used by selecting antioxidants for use in the present invention.

The following description relates to how to evade bad effects of the above-described antioxidants on photographic films. In general, as thermoplastic resins have more ramifications of $CH_3$, oxygen absorption thereof becomes the larger, and thus oxidative destruction thereof becomes the larger.

Hydrocarbon is thought to be automatically oxidized once a free-radical is generated by dehydration in the presence of oxygen, according to the following formulas as chain reaction:

1) $RH \rightarrow R\cdot$
2) $R\cdot + O_2 \rightarrow ROO\cdot$
3) $ROO\cdot + RH \rightarrow ROOH + R\cdot$
4) $ROOH \rightarrow RO\cdot + \cdot OH$
5) $RO\cdot + RH \rightarrow ROH + R\cdot$
6) $\cdot OH + RH \rightarrow HOH + R\cdot$ Thus, the oxidation of hydrocarbon is accelerated to produce a great quantity of alcohols, aldehydes, acids and the like, and they react with each other to produce polymer.

In order to prevent oxidation of hydrocarbon, it is necessary to intercept the above chain reaction. Antioxidant is used for this purpose. In alternative, it is preferable to load radial scavenger as set forth below.

Examples of the radical scavenger include 1,1-diphenyl-2-picrylhydrazyl, 1,3,5-triphenylferdazyl, 2,2,6,6-tetramethyl-4-piperidone-1-oxyl, N-(3-N-oxyanilino-1,3-dimethybutylidene)-aniline oxide, a high valency metal salt such as ferric chloride, diphenylpicrylhydrazine, diphenylamine, hydroquinone, t-butylcatechol, dithiobenzoyldisulfide, p,p'-ditolyltrisulfide, a benzoquinone derivative, a nitro compound and a nitroso compound. Among these, preferred is hydroquinone. The above-described radical scavengers may be used either alone or in combination of several kinds. Compounding amount of radical scavenger may be from 1.000 ppm to 10.000 ppm.

As the antioxidant, there are radical group chain terminator which reacts with radical groups, mainly $ROO\cdot$, which are chain carriers, to inactivate them, and peroxide decomposer which decomposes hydroperoxide ROOH which is the main source of radical groups, to stabilize it.

The radical group chain terminator includes phenol antioxidant and aromatic amine antioxidant. The peroxide decomposer includes sulfur-containing antioxidant and phosphorus-containing antioxidant.

Since antioxidant is a reducing agent which adversely affects photographic film, unless its kind and the compounding amount is carefully examined, degradation of photographic film becomes a great problem.

Examples of the antistatic agent preferably loaded in the opaque thermoplastic resin for use in the invention are described below.

I. Nonionic (1) Alkylamine derivative:

T-B103 (Matsumoto Yushi), T-B104 (Matsumoto Yushi)
Alkylamide type:

Polyoxiyethylene alkylamine: Armostat 310 (Lion Fat & Oil)

Tertiary amine (laurylamine): Armostat 400 (Lion Fat & Oil)

N,N-bis(2-hydroxyethlcocoamine): Armostat 410 (Lion Fat & Oil)

Tertiary amine: ANTISTATIC 273C, 273, 273E (Fine Org. Chem.)

N-hydroxyhexadecyldiethanolamine: Belg. P.654, 049
N-hydroxyoctadecyldiethanolamine: National Dist.

(2) Fatty acid amid derivative:

TB-115 (Matsumoto Yushi), Elegan P100 (Nippon Oils & Fats), Erik SM-2 (Yoshimura Yukagaku)

Hydroxystearic amide
Oxalic-N,N'-distearylamidebutylester (Hoechst)
Polyoxyethylenealkylamide (3) Ether type Polyoxyethylenealkylether $RO(CH_2CH_2O)_nH$ Polyoxyethylenealkylphenyl ether Special nonionic type: Resistat 104, PE100, 116–118 (Dai-ich Kogyo Seiyaku), Resistat PE 132, 139 (Dai-ichi Kogyo Seiyaku), Elegan E115, Chemistat 1005 (Nippon Oils & Fats), Erik BM-1 (Yoshimura Yukagaku), Electrostripper TS, TS 2, 3, 5, EA, EA2, 3 (Kao).

(4) Polyhydric alcohol ester type
  Glycerine fatty acid ester: mono-, di- or triglyceride of stearic acid or hydroxystearic acid, monogplyceride (Nippon Shono), TB-123 (Matsumoto Yushi), Resistat 113 (Dai-ichi Kogyo Seiyaku).
  Sorbitan fatty acid ester
  Special ester: Erik BS-1 (Yoshimura Yukagaku)
    1-Hydroxyethyl-2-dodecylglyoxazoline: (British Cellophane)

II. Anionic
(1) Sulfonic acids
  Alkylsulfonate
  $RSO_3Na$
  Alkylbenzonesulfonate
  Alkylsulfate
  $ROSO_3Na$
(2) Phosphric ester type
  Alkyl phosphate III. Cationic
(1) Amide type cation:
  Resistat PE300, 401, 402, 406, 411 (Dai-ichi Kogyo Seiyaku)
(2) Quaternary ammonium salt
  Quaternary ammonium chloride
  Quaternary ammonium sulfate
  Quaternary ammonium nitrate
    catimin CSM-9 (Yoshimura Yukagaku), CATANAC 609 (American Cyanamide), Denon 314C (Marubishi Yuka), Armostat 300 (Lion Fat & Oil), 100V (ARMOR), Electrostripper ES (Kao Soap), Chemistat 2009A (Nippon Oils & Fats), Stearamido propyldimethyl-β-hydroxyethyl ammonium nitrate: CATANAC-SN (American Cyanamide)

IV. Ampho-ionic
(1) Alkylbetaine type:
(2) Imidazoline type:
  Leostat 53, 532 (Lion Fat & Oil), AMS 53 (Lion Fat & Oil), AMS 303, 313 (Lion Fat & Oil)
  Alkylimidazoline type
(3) Metal salt type:
  AMS 576 (Lion Fat & Oil)
  Leostat 826, 923 (Lion Fat & Oil)
  $RNR'CH_2CH_2CH_2NCH_2COO-$ (Lion Fat & Oil)
  $R=C_{3-N}$ hydrocarbon, A=oxygen or an imino group, M=organic amine or a metal
(4) Alkyl alanine type:

V. Electroconductive Resin
  Polyvinylbenzyl type cation
  Polyvinylic acid type cation VI. Others:
  Registat 204, 205 (Dai-ichi Kogyo Seiyaku), Elegan 2E, 100E (Nippon Oils & Fats), Chemistat 1002, 1003, 2010 (Nippon Oils & Fats), Erik 51 (Yoshimura Yukagaku), ALROMINE RV-100 (Geigy)

Among the above-described antistatic agents, the non-ionic antistatic agent is particularly preferred due to small bad effect on photographic properties and human body.

The total addition amount of two or more antistatic agents is preferably from 0.001 wt % to 5.0 wt %, and more preferably from 0.005 wt % to 3.0 wt %. If the addition amount is less than 0.001 wt %, the addition effect is not satisfactory and only cost for kneading increase. On the other hand, if the addition amount exceeds 5.0 wt %, slipping between the melted resin and the screw of the extruding machine is readily caused and the ejection amount of resin becomes unstable. Further, blocking or bleeding out is liable to be generate by aging after molding.

Other additives may be selectively added to the resin for forming the cassette shell of the invention according to necessary properties and purposes, but the kinds and addition amounts of these additives have to be carefully determined so as not to have bad effect on photographic properties. Example of the other additives are as follows:

(1) Plasticizer
  phthalic acid esters, glycol esters, fatty acid ester, phosphoric acid esters, etc.
(2) Stabilizer
  lead compounds, cadmium compounds, zinc compounds, alkaline earth metal compound, organic tin compounds, etc.
(3) Flame retardant
  phosphoric acid esters, phosphoric acid ester halides, halides, inorganic materials, polyols containing phosphor, etc.
(4) Filler
  alumina, kaolin, clay, calcium carbonate, mica, talc, titanium dioxide, silica, etc.
(5) Reinforcing agent
  glass lobbing, metallic fiber, glass fiber, glass milled fiber, carbon fiber, etc.
(6) Blowing agent
  inorganic blowing agent (ammonium carbonate, sodium bicarbonate), organic blowing agent (nitroso-group and azo-group blowing agents), etc.
(7) Vulcanizing agent
  vulcanization accelerator, acceleration assistant, etc.
(8) Deterioration preventing agent
  ultraviolet absorber, metal deactivator, peroxide decomposing agent, etc.
(9) Coupling agent
  silane compounds, titanium compounds, chromium compounds, aluminum compound, etc.
(10) Various thermoplastic resins, elastomers, rubbers, etc.

What is claimed is:

1. In a photographic film cassette comprising a rotatable spool, light-shielding means mounted behind a film passage mouth so as to be rotatable between a closed position for preventing ambient light from entering said photographic film cassette and an open position for allowing a filmstrip to pass through said film passage mouth, locking means movable into engagement with said spool to inhibit rotation of said spool and out of engagement with said spool to release said spool, and a cam rotatable together with said light-shielding means, said cam pushing said locking means into engagement with said spool responsive to said light-shielding means being rotated into said closed position, said cam allowing said locking means to move out of engagement with said spool responsive to said light-shielding means being rotated into said open position, the improvement wherein
  said locking means has a cam follower surface at which said cam pushes said locking means, and said cam follower surface is adapted to apply an amount of force to said cam in a direction to bias said light-shielding means toward said closed position while said light-shielding means is in said closed position.

2. A photographic film cassette as claimed in claim 1, wherein said force is applied along a line normal to said cam follower surface, said normal line being shifted by a distance from a line which is parallel to said normal line and extends across a rotary axis of said light-shielding means, such that a torque toward said closed position acts on said light-shielding means.

3. A photographic film cassette as claimed in claim 2, wherein the amount of said force has a value f in a range from 0.5 gf to 100 gf, and more preferably from 1 gf to 50 gf.

4. A photographic film cassette as claimed in claim 3, wherein said distance has a value d in a range from 0.1 mm to 2 mm, and more preferably from 0.15 mm to 1.5 mm.

5. A photographic film cassette as claimed in claim 4, wherein said torque has a value f×d in a range from 0.05 gf·mm to 200 gf·mm, more preferably from 0.1 gf·mm to 120 gf·mm, and most preferably from 0.2 gf·mm to 50 gf·mm.

6. A photographic film cassette as claimed in claim 2, wherein said locking means is pivotal about a first axis which is substantially parallel to said rotary axis of said light-shielding means, said rotary axis being substantially parallel to a rotary axis of said spool.

7. A photographic film cassette as claimed in claim 6, wherein said locking means has a resilient arm on one end thereof, and said cam follower surface is formed at a distal end portion of said resilient arm, and wherein a clearance is provided between said cam and said distal end portion when said light-shielding means is in said open position.

8. A photographic film cassette as claimed in claim 7, wherein said locking means includes a hook formed on one side thereof which extends substantially perpendicularly to said rotary axes, said hook being engaged in a recessed portion of an inner wall of a cassette shell of said photographic film cassette, said inner wall extending substantially perpendicularly to said rotary axes.

9. A photographic film cassette as claimed in claim 8, wherein a second inner wall is formed in opposition to said recessed portion to confine said hook in engagement with said recessed portion.

10. In a photographic film cassette comprising a rotatable spool, light-shielding means supported behind a film passage mouth for closing movement to prevent ambient light from entering said photographic film cassette and for opening movement to open said film passage mouth, locking means supported for pivotal movement into engagement with said spool to inhibit rotation of said spool responsive to closing movement of said light-shielding means, and out of engagement with said spool responsive to rotating movement of said spool, the improvement wherein said locking means is pivotally supported by an engaging portion formed inside said photographic film cassette, and has an integrally formed engaging member, said engaging member being adapted to be brought into engagement with said engaging portion when said locking means is placed in an initial assembled position, said locking means being thereafter pivotally moved about said engaging member from said initial assembled position into a final assembled position where said locking means may cooperate with said light-shielding means, and wherein a larger clearance is provided between said engaging portion and said engaging member in said initial assembled position compared with said final assembled position.

11. A photographic film cassette as claimed in claim 10, wherein a clearance "C1" between said engaging portion and said engaging member in said initial assembled position is in a range from 0.1 mm to 1 mm, and more preferably from 0.15 mm to 0.5 mm, whereas a clearance "C2" between said engaging portion and said engaging member in said final assembled position is in a range from 0 mm to 0.5 mm, and more preferably from 0.05 mm to 0.3 mm.

12. A photographic film cassette as claimed in claim 11, wherein said engaging member includes a hook formed on said locking means, while said engaging portion includes a recessed portion formed in an inner wall of a cassette shell of said photographic film cassette.

13. A photographic film cassette as claimed in claim 12, wherein said engaging portion includes a second inner wall formed in opposition to said recessed portion to confine said hook in engagement with said recessed portion.

14. A photographic film cassette as claimed in claim 13, wherein said locking means is pivotal about a first axis which is substantially parallel to a rotary axis of said spool, and has said hook formed on one side thereof extending substantially perpendicularly to said rotary axis, and said inner walls extend substantially perpendicularly to said rotary axis.

\* \* \* \* \*